Dec. 4, 1951 R. FEITL 2,577,319
RETAINING RING
Filed Oct. 11, 1948 2 SHEETS—SHEET 1

Inventor
RUDOLF FEITL,
By [signature]
ATTORNEY

Dec. 4, 1951  R. FEITL  2,577,319
RETAINING RING
Filed Oct. 11, 1948  2 SHEETS—SHEET 2

Inventor
RUDOLF FEITL,
ATTORNEY

Patented Dec. 4, 1951

2,577,319

UNITED STATES PATENT OFFICE 2,577,319

RETAINING RING

Rudolf Feitl, Brooklyn, N. Y., assignor to Waldes Kohinoor, Inc., Long Island City, N. Y., a corporation of New York Application October 11, 1948, Serial No. 53,844

6 Claims. (Cl. 85—36)

This invention relates to improvements in retaining rings, and more particularly to improved external retaining rings of the so-called self-locking type.

The conventional retaining ring usually consists of an open-ended annulus which is adapted to be sprung into a seating groove provided in a shaft or housing bore and has sufficient radial depth as to form an artificial shoulder capable of securing a machine part against axial displacement on the shaft or in the housing bore. For certain retaining ring assemblies in which it is necessary or desirable to dispense with a seating groove, it is well known to employ retaining rings of the so-called self-locking type, such usually consisting of a closed annulus provided along its shaft or housing bore edge with radially protruding locking tongues which engage on the shaft or bore surface. These locking tongues are inclined to the plane of the ring body in direction as to give way when the ring is assembled, as by shifting it over the shaft or into the housing bore, but to frictionally secure themselves to and lock with the shaft under thrust load exerted in the opposite direction, so that under thrust load the holding power of the ring is increased.

Self-locking rings of this type, although very efficient under small thrust loads, are open to the objection that the locking tongues, when subjected to heavy thrusts occurring in some assemblies, tend to snap "past center" with respect to the plane of the ring body to a position of opposite inclination in which they lack holding power. Considering specifically the case of the prior external self-locking rings of conventional construction, namely, a ring adapted for use on a shaft, such a ring is provided with several spaced tongues or prongs protruding inwardly from the inner circumference of the circular ring body in more or less isolated fashion. These isolated tongues act independently of one another and of the ring body as well, and thus have only limited elastic stability. Hence, they tend to snap over center to a position of opposite inclination when subjected to heavy thrust loads, whereupon they lose their frictional grip on the shaft as aforesaid.

It is an object of the present invention to overcome the aforesaid disadvantages of the prior self-locking retaining rings, through the provision of an improved self-locking ring characterized by locking tongues or prongs which are effectively a part of the ring body rather than isolated prongs extending from the inner edge of the ring body, and in which the ring body is especially designed to counteract the tendency of the prongs to snap past center when the shoulder formed by the ring is subjected to heavy thrusts.

A further object of the invention is to provide a self-locking retaining ring characterized by equi-lateral triangular shape and having locking prongs formed in the angle portions of the ring body arranged so that their center lines coincide with the lines bisecting said angles, whereby the prongs are symmetrically disposed and any two prongs are interconnected by the side edge portions of the ring body which extend as straight arms between prongs.

Still another object of the invention is to provide an improved self-locking retaining ring having a triangular ring body and locking prongs formed in the angle portions thereof as aforesaid, in which the securing edges of the prongs lie on a circle having slightly smaller radius than the radius of the shaft circle, whereby when such a ring is slipped over and shifted along the shaft in direction to increase the inclination of the prongs, the ring body portions connecting the prongs are capable of flexing so as to assist the prongs to readily find their proper inclination, and when the ring is subjected to thrust load in the opposite direction, the connecting arms are put under tension, which not only counteracts the tendency of the prongs to snap to an over-center or non-holding position, but also causes said prongs to increase their holding power on the shaft.

The above and other objects and features of advantage of the improved self-locking retaining ring will be apparent from the following detailed description thereof, taken with the accompanying drawings illustrating several ring embodiments, in which—

Figure 1:
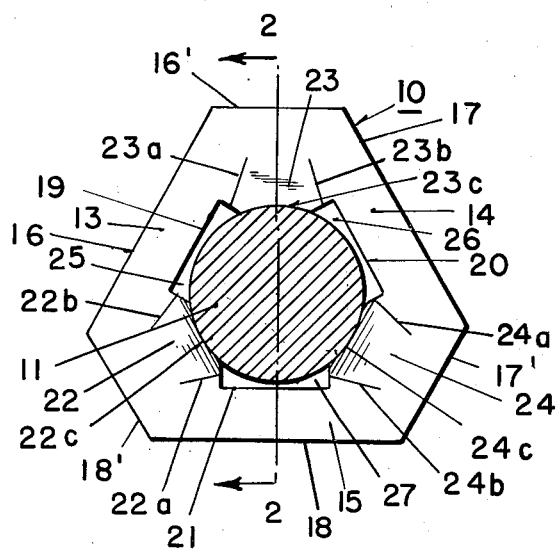
Fig. 1 is a front view of a ring according to the invention assembled on a shaft.
Figure 2:
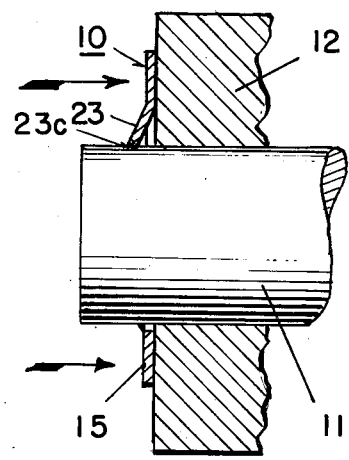
Fig. 2 is a section along line 2—2 of Fig. 1, also showing the machine part to be secured by the ring.

The improved self-locking ring according to the invention is generally designated 10, being shown in Figs. 1 and 2 as assembled on a shaft 11, and serving the purpose of maintaining a machine part 12 (Fig. 2) against axial displacement on the shaft. The illustrated ring is of equi-lateral triangular shape rather than of conventional circular form, and thus has three straight arms or bridges 13, 14, 15, which connect the angles of the ring body, said arms being defined by the straight outer edges 16, 17 and 18 of the triangular body and inner parallel edges 19, 20 and 21, which latter in part define elongated shallow recesses to be later described and which open into the shaft opening with which the triangular body is provided. Three equi-distantly spaced locking prongs 22, 23, 24 are struck out of the material of the ring body angles, said prongs having side edges defined by the slits 22a and 22b, 23a and 23b, and 24a and 24b, and free or shaft-engaging edges 22c, 23c and 24c, respectively. The slit lines defining the side edges of the tongues are symmetrical to the lines bisecting the angles of the triangular ring body, as shown.

Extending between the prongs and defined substantially by the inner edges 19, 20, 21 of the connecting arms are the aforesaid elongated small depth recesses 25, 26, 27, providing clearance space for the shaft both during assembly of the ring thereon and in final assembly. The form and depth of these recesses may be varied from that shown, but in any case they are chosen so that the section of the arms 13, 14 and 15 connecting the prongs is both adequate to withstand the tension that the arms are required to take under the maximum thrust load likely to be encountered by the ring, and at the same time flexible enough to render the arms yieldable in the operation of shifting the ring over the shaft to its assembled position.

The free edges 22c, 23c and 24c of the tongues may be formed straight but preferably they are curved as shown in conformity with the curvature of the shaft 11 and to extend as arcs of a circle having diameter which is slightly smaller than the shaft diameter.

To reduce sharp cornering of the ring body, the apices of the angles are cut away along right lines to the lines bisecting the angles and to a depth such as not to impair the requisite strength of the ring body. Hence, the outer edge of the body defines a hexagon having long equal sides 16, 17 and 18 and short equal sides 16', 17' and 18', the latter corresponding to the right-line formed by cutting off of the apices.

Figure 7:
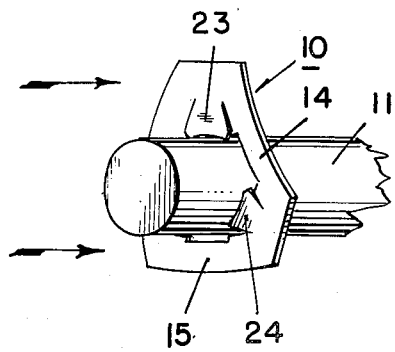
Fig. 7 is a perspective view of the ring assembly as shown in Fig. 1, but illustrating the flexing action of the arms connecting the prongs occuring when the ring is shifted over the shaft in the direction of the arrows.

The action of a ring as aforesaid when shifted over its shaft in one direction and when exposed to thrust load acting in the opposite direction is as follows:

As can be seen from Figs. 1, 2 and 7, when the ring is shifted over a shaft 11 having larger diameter than that of the circle containing the free edges of the prongs, the inclination of the prongs tends to increase, and their root distance, i. e. the distance of their root lines from the shaft center tends to decrease. Accordingly, the side arms 13, 14, 15 of the ring body which connect the prongs are placed under compression and tend to flex or bow forwardly out of the plane of the ring body. The ability of the side arms to flex as aforesaid makes the ring body extremely yieldable, so that the ring is especially adapted for use on shafts whose diameter is considerably larger than that of the circle on which the prong edges 22c, 23c, 24c normally lie, since the ring body itself takes up some of the forces that would otherwise cause the prongs to bend to an excessive inclination as might impair their frictional holding power on the shaft.

When a normal thrust load is exerted on the ring by the machine part 12, such of course acts against the inclination of the prongs, and results in the prongs fixing themselves firmly to the shaft. If now the thrust load increases substantially, the prongs tend to straighten out, i. e. to return to the plane of the ring body and their root distance tends to increase. As a consequence, arms 13, 14, 15 which connect the prongs and define their root distance tend to straighten out and are placed under tension. The arms now act as rigid links which resist further increase in the root distance of the prongs, so that the prongs fix themselves on the shaft with increased friction, rather than being snapped over center as may occur with conventional rings. Hence, by proper dimensioning of arms 13, 14 and 15 in relation to the length and initial inclination of the prongs, they are capable of applying a force in reaction to heavy thrust loads, which causes the prongs to more securely engage with and lock the ring on the shaft.

A notable advantage of the improved three-prong ring with long arms or bridges integrally connecting the prongs flows from the fact that the reaction forces created by the arms on the prongs equal each other because of the symmetrical three-point engagement of the prongs with shaft, and that such forces are maintained even in installations in which the surface of the shaft is not exactly circular or cylindrical.

Figure 5:
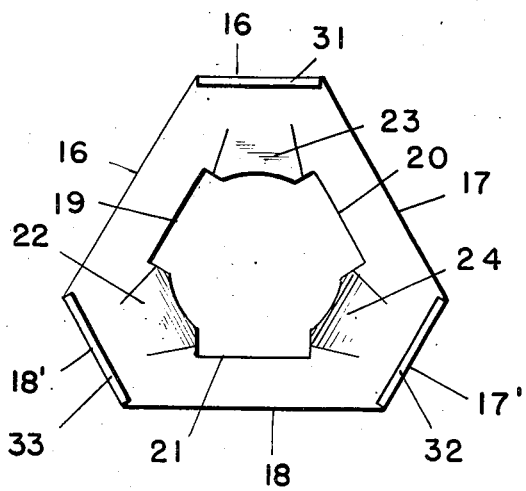
Figs. 5 and 6 are views similar to Figs. 3 and 4, illustrating a modification of the ring shown in the earlier numbered figures.
Figure 6:
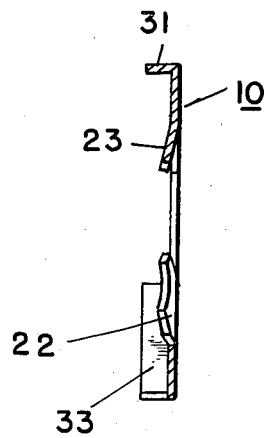

Although following the same general form of ring as previously described, the modified ring illustrated in Figs. 5 and 6 is formed along its equal short sides 16', 17' and 18' with right-angled flanges 31, 32 and 33 which serve to strengthen the ring body against forces tending to twist it out of its plane, a feature of merit where the ring is made of very thin material, as required for small size shafts.

Figure 8:
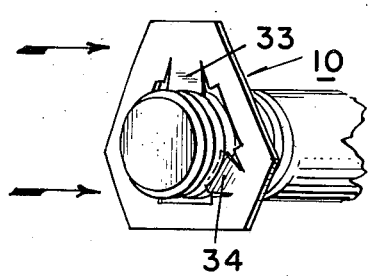
Fig. 8 is a perspective view of a ring according to the invention, modified to act as an elastic nut.
Figure 3:
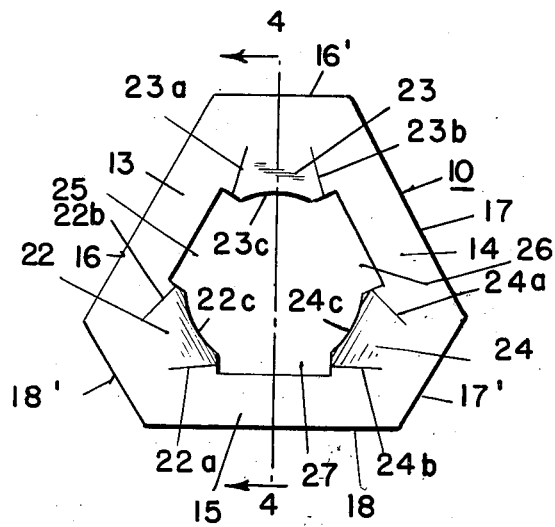
Fig. 3 is a front view of the improved ring in its free state, i. e. before assembly.
Figure 4:
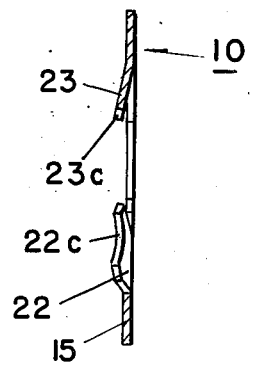
Fig. 4 is a section along line 4—4 of Fig. 3.

In the Fig. 8 modification, the three prongs, of which two designated 34 and 35 are visible, are twisted out of the ring plane so that their free edges lie on a helix, and are thereby adapted to engage the threads of a bolt having the same helix angle. Such a ring functions as an elastic nut and can be more simply installed than the rigid or solid nut which requires the usual threading-on operation.

Without further analysis, it will be appreciated that a retaining ring having a triangular body portion, with prongs struck out from the angles of the body and connected by straight flexible arms as aforesaid, overcomes the hereinbefore noted disadvantages of the prior self-locking rings whose locking tongues or prongs are in effect isolated from the ring body and hence are sufficiently unstable that they may flex over center and lose their holding power on a shaft with which they are assembled. Rather, a ring according to the present invention takes into account the tendency of the prongs to move to an inoperative position or non-locking position, but its design is such as not only to counteract this tendency in highly effective manner but also to give increased holding power to the ring under the large thrust loads to which it may be subjected.

As many changes could be made in carrying out the ring construction described without departing from the scope of the invention, it is intended that all matter contained in the above description or shown in the accompanying drawings shall be interpreted as illustrative and not in a limiting sense.

I claim:

1. A retaining ring of the self-locking type adapted to form an artificial shoulder on a shaft capable of preventing axial displacement of a machine part mounted thereon, said ring comprising a substantially triangular body having a central shaft opening, three prongs struck out from the material of the angles of the body and having inner edges adapted to frictionally engage the shaft, the center lines of said prongs coinciding with lines bisecting the angles of the ring body, the inner edges of the body between prongs being straight and parallel to the outer side edges of the body and defining elongated shallow recesses opening into the shaft opening and which provide shaft clearance between the prongs and the corresponding side edges of any two prongs being substantial continuations of the adjacent straight body inner-edge which extends between said two prongs, the side edge portions of the body thus extending as straight arms between and which effectively connect the prongs.

2. A retaining ring as set forth in claim 1, wherein the side edges of the prongs are defined by slits symmetrically arranged on both sides of the lines bisecting the angles of the ring body.

3. A retaining ring as set forth in claim 1, wherein the free edges of the prongs extend as arcs of a circle of slightly less radius than that of the shaft circle.

4. A retaining ring of the self-locking type adapted to form an artificial shoulder on a shaft capable of preventing axial displacement of a machine part mounted thereon, said ring comprising an initially equilateral triangular body with apices cut away on right lines to lines bisecting the angles thereof whereby the ring body has hexagonal outline and is defined by three equal long edges and three equal small sides, the triangular body having a central shaft opening which is defined in part by the inner edges of prongs struck out from the material of the angles of the body and which are arranged on a circle of radius smaller than that of the shaft circle, and in part by elongated shallow recesses extending between each two of said prongs which provide shaft clearance and whose bottom edges extend parallel to the adjacent long edges of the ring body, whereby the edge portions of the body along its long sides extend as straight arms connecting said prongs.

5. A retaining ring as set forth in claim 4, wherein the side edges of the prongs are defined by slits symmetrically arranged on both sides of the lines bisecting the angles of the ring body.

6. A retaining ring as set forth in claim 4, wherein the free edges of the prongs extend as arcs of a circle of slightly less radius than that of the shaft circle.

RUDOLF FEITL.

REFERENCES CITED

The following references are of record in the file of this patent:

UNITED STATES PATENTS

| Number | Name | Date |
|---|---|---|
| 295,960 | Van Dusen | Apr. 1, 1884 |
| 334,790 | McTighe | Jan. 26, 1886 |
| 968,991 | Shafer | Aug. 30, 1910 |
| 2,275,058 | Draving | Mar. 3, 1942 |
| 2,309,613 | Horton | Jan. 26, 1943 |
| 2,383,164 | Ryder | Aug. 21, 1945 |
| 2,435,079 | Hotchkin | Jan. 27, 1948 |